(12) United States Patent
Harness

(10) Patent No.: US 10,550,798 B2
(45) Date of Patent: Feb. 4, 2020

(54) LPG FUEL SYSTEM

(71) Applicant: Henry Harness, Santa Ana, CA (US)

(72) Inventor: Henry Harness, Santa Ana, CA (US)

(73) Assignee: GreenKraft Inc., Santa Ana, CA (US)

(*) Notice: Subject to any disclaimer, the term of this patent is extended or adjusted under 35 U.S.C. 154(b) by 0 days.

(21) Appl. No.: 16/146,850

(22) Filed: Sep. 28, 2018

(65) Prior Publication Data

US 2019/0203663 A1    Jul. 4, 2019

Related U.S. Application Data

(63) Continuation of application No. 14/268,480, filed on May 2, 2014, now abandoned.

(60) Provisional application No. 61/908,022, filed on Nov. 22, 2013.

(51) Int. Cl.
*F02M 21/06* (2006.01)
*F02D 19/06* (2006.01)
*F02M 21/02* (2006.01)

(52) U.S. Cl.
CPC ......... *F02M 21/06* (2013.01); *F02D 19/0647* (2013.01); *F02M 21/023* (2013.01); *F02M 21/0212* (2013.01); *F02M 21/0221* (2013.01); *F02M 21/0287* (2013.01); *Y02T 10/32* (2013.01)

(58) Field of Classification Search
CPC ........... F02M 21/0212; F02M 21/0287; F02M 21/06; F02D 19/0647; F02B 43/02; F02B 43/04; F02B 43/06
See application file for complete search history.

(56) References Cited

U.S. PATENT DOCUMENTS

| | | | | |
|---|---|---|---|---|
| 5,158,051 A * | 10/1992 | Wada | ...... | F02M 1/04 123/179.15 |
| 5,501,200 A * | 3/1996 | Bogartz | ...... | F02B 43/00 123/527 |
| 6,196,204 B1 * | 3/2001 | Janach | ...... | F02B 43/04 123/527 |
| 8,272,353 B2 * | 9/2012 | Dincer | ...... | F02B 43/10 123/3 |
| 8,495,990 B1 * | 7/2013 | Rivera | ...... | F02M 27/08 123/538 |
| 8,695,357 B2 * | 4/2014 | Brook | ...... | F02M 21/06 62/49.1 |
| 8,783,281 B2 * | 7/2014 | Carter | ...... | F02M 21/0221 123/304 |
| 9,188,069 B2 * | 11/2015 | Steffen | ...... | F02D 19/0647 |
| 9,863,370 B2 * | 1/2018 | Jansson | ...... | F17C 5/02 |
| 9,957,920 B2 * | 5/2018 | Walser | ...... | F02M 21/0233 |
| 2011/0011354 A1 * | 1/2011 | Dincer | ...... | F02B 43/10 123/3 |
| 2011/0146605 A1 * | 6/2011 | Dixon | ...... | F02B 43/10 123/1 A |

(Continued)

*Primary Examiner* — Kevin R Steckbauer
(74) *Attorney, Agent, or Firm* — John K. Buche; Bryce A. Johnson; Buche & Associates, P.C.

(57) ABSTRACT

Disclosed is a liquefied petroleum fuel system for internal combustion engines that improves fuel economy by mixing vaporized liquid petroleum gas (LPG) and ambient air at substantially equal random kinetic energies. The system maintains a certain vapor pressure in the LPG tank and delivers the LPG in a gaseous phase to an LPG burning device at a set pressure and temperature. The cycle repeats as necessary to maintain the desired pressure in the tank.

3 Claims, 5 Drawing Sheets

(56) References Cited

U.S. PATENT DOCUMENTS

| | | | | |
|---|---|---|---|---|
| 2011/0314839 A1* | 12/2011 | Brook | ............... | F02M 21/06 |
| | | | | 62/49.1 |
| 2012/0060935 A1* | 3/2012 | Carter | ............... | F02M 21/0212 |
| | | | | 137/14 |
| 2013/0199629 A1* | 8/2013 | Hemsley | ............... | F23K 5/002 |
| | | | | 137/341 |
| 2013/0333671 A1* | 12/2013 | Walser | ............... | F02M 21/0233 |
| | | | | 123/480 |
| 2014/0182551 A1* | 7/2014 | Steffen | ............... | F02D 19/0647 |
| | | | | 123/446 |
| 2014/0182559 A1* | 7/2014 | Steffen | ............... | F02D 19/0647 |
| | | | | 123/478 |
| 2015/0315949 A1* | 11/2015 | Jansson | ............... | F17C 5/02 |
| | | | | 123/2 |

\* cited by examiner

| 2. Engine Specification | | | | | | | |
|---|---|---|---|---|---|---|---|
| Engine Description | | | | | Max. Power | 323 bhp @ 4550 RPM | |
| Engine ID | | | | | Max. Torque | 375 lb-ft @ 3500 RPM | |
| Engine Displacement | | 6000cc | | | Max. Speed | 4600 RPM | |
| Cyls x Bore x Stroke | 0x 0mm x92 mm | | | | Idle Speed | 850 RPM | |

4.1 Cold Start Test Results Grams Brake Horsepower Hour

| Work [bhp-hr] | CO [g/hp-hr] | THC [g/hp-hr] | NO$_x$ [g/hp-hr] | CO$_2$ [g/hp-hr] | NMHC [g/hp-hr] | BSFC [g/hp-hr] | PM [g/hp-hr] |
|---|---|---|---|---|---|---|---|
| 16.1 | 3.020 | 0.102 | 0.187 | 752.3 | 0.084 | 0.557 | 0.000 |

4.1 Hot Start Test Results Grams Brake Horsepower Hour

| Work [bhp-hr] | CO [g/hp-hr] | THC [g/hp-hr] | NO$_x$ [g/hp-hr] | CO$_2$ [g/hp-hr] | NMHC [g/hp-hr] | BSFC [g/hp-hr] | PM [g/hp-hr] |
|---|---|---|---|---|---|---|---|
| 16.1 | 2.779 | 0.011 | 0.075 | 755.9 | -0.012 | 0.559 | 0.000 |

4.1 Weighted Cold and Hot Test Results Grams Brake Horsepower Hour

| Work [hp] | CO [g/hp-hr] | THC [g/hp-hr] | NO$_x$ [g/hp-hr] | CO$_2$ [g/hp-hr] | NMHC [g/hp-hr] | BSFC [g/hp-hr] | PM [g/hp-hr] |
|---|---|---|---|---|---|---|---|
| 16.1 | 2.813 | 0.024 | 0.091 | 755.4 | 0.001 | 0.559 | 0.000 |

FIG. 5

LPG FUEL SYSTEM

CROSS-REFERENCE TO RELATED APPLICATIONS

This application is a continuation of U.S. patent application Ser. No. 14/268,480 (filed May 2, 2014), which application claims the priority benefit of U.S. Prov. Pat. App. Ser. No. 61/908,022 (filed Nov. 22, 2013) and entitled LPG Fuel System." Both the provisional patent application and earlier filed patent application are hereby incorporated by reference in their entirety.

STATEMENT REGARDING FEDERALLY SPONSORED RESEARCH OR DEVELOPMENT

Not Applicable.

BACKGROUND OF INVENTION

Field of the Invention

The subject matter of this disclosure is in the field of systems for Liquefied Petroleum Gas (LPG) fuel systems for internal combustion engines and related methods. More specifically, the subject matter of this disclosure is related to LPG fuel systems for internal combustion engines of road vehicles, stationary machines, marine vehicles, and gas turbines.

Background of the Invention

LPG is a fossil fuel that is prepared by refining petroleum or natural gas. The refined gas results in several types of liquid fuel, including: propane, butane, or isobutane. In one use, LPG is vaporized, mixed with air, and burned.

Of the types of LPG, liquid propane is useful for internal combustion engines because it has a very low boiling point so that the liquid vaporizes for combustion immediately upon release from a pressurized container. Butane burns cleaner and contains more energy than propane, but butane has a higher boiling point, meaning that it will not vaporize in very cold temperatures. As a result, propane and butane are sometimes mixed to optimize LPG fuel formulas for a variety of conditions.

Many LPG fuel systems are commercially available in connection with automobile engines. In these systems, LPG is stored in a liquid phase before being vaporized, mixed with air, introduced into the automobile's intake manifold or combustion chamber, and ignited. For LPG to ignite when mixed with air, a fueling system must achieve a mixture of LPG and air with the correct flammability limits. Specifically, LPG will typically only burn when the ratio of LPG to air is between 2.15 percent and 9.60 percent of the LPG-air mixture by mass.

Although capable of resulting in a combustible mixture of air and LPG, known LPG fueling systems have not been entirely satisfactory for use in automobiles. One reason for the unsatisfactory aspects of known systems is that the systems mix vaporized air and LPG vapor at different kinetic energies, so that mixing is not thorough and the mixture or portions of the mixture are outside of the preferable flammability limits.

Even when an LPG-air mixture is within the flammability limits, other problems can arise based on the mixture's ratio of LPG to air. When there is too little LPG in the LPG-air mixture, the mixture burns poorly and the combustion exhaust will have high mono-nitrogen oxide ($NO_x$) levels. When too much LPG is in the LPG-air mixture, the mixture burns richly and the combustion will produce high levels of hydrocarbons (HC) and carbon monoxide (CO). A situation of too much or either too little LPG is undesirable because: (1) unburned air-fuel mixtures result in low fuel economy or efficiency and unclean (spark knock) burning that causes reduced engine power, and (2) increased levels of $NO_x$, CO, and HC in the exhaust that result in higher carbon dioxide ($CO_2$) emissions after catalytic conversion.

Ordinary automotive engines and fuel delivery systems are also very inefficient for mixing vaporized LPG with air. One cause of the inefficiency is that atmospheric air velocity is continuously changing due to the pressure differential between the atmosphere and the intake manifold. Pressure variations within an engine's column of air cause the size of the particles of atomized fuel to vary throughout the engine's revolutions per minute (RPM) range. This variation can result in inconsistent LPG-air mixture burn.

To avoid the problem of varying air quality, some engines are provided with a throttle. But, throttled air is problematic because such air can require additional energy for vaporization of the LPG and mixing of the LPG and air. In a standard automotive throttled fuel injection system, air is provided at a high velocity so that heat is transferred to the throttle blades, which reduces the air inlet temperature to approximately 40° F. This reduction in inlet temperature reduces the amount of heat available from the atmosphere to evaporate the liquid fuels and brings the vaporized fuels to the same kinetic energy as the air for proper mixing of the two components.

Another problem with current LPG systems is that once the LPG is injected into the cylinder head's intake port, mixture velocity of the air and LPG is often so high that some of the fuel droplets are centrifuged out of the air stream as the air stream enters the combustion chamber. This centrifuging results in two portions of air/fuel mixture: (1) the portion that contains the centrifuged LPG and (2) the portion that does not. Each portion of the mixture has an unfavorable fuel to air ratio despite the overall air/fuel ratio of the whole being correct when it entered the combustion chamber. While the portions may combust, one section has too much LPG and another section has too little. The mixture portion with too much LPG will result in carbon residues accumulating in the combustion chambers and on the piston tops. Portions of the mixture with too little LPG will burn poorly and increase $NO_x$ levels. Too little LPG can also result in high localized temperatures that can cause auto-ignition or detonation of the end gases, which can be destructive.

Known LPG fuel systems are also problematic for internal combustion engines. During the compression stroke of an engine, the heat of compression is supposed to maintain a vaporized air/fuel mixture in the cylinder so that the mixture can be ignited. However, compressing the mixture increases the pressure and, as a result, the boiling point of the fuel increases so that portions of the mixture may not fall within its flammability limits. Then, when the spark plug tries to ignite these portions of the mixture, a flame front is created and the fuel does not combust correctly. Later, during the power stroke of the engine, pressure in the cylinder and the boiling point of the mixture decreases and the unburned fuel evaporates and burns. This is problematic because if the fuel burns too late, it can interfere with an optimal crankshaft angle for producing power and produces high exhaust gas temperatures that require larger cooling systems and wasted energy.

Catalytic converters solve some of the problems of inefficiency and pollution associated with current LPG systems, but not all of them. For instance, any remaining fuel that did not chemically react in the combustion chamber or in the exhaust manifold can be introduced into the catalytic converter. This fuel can escape a catalytic converter and enter the atmosphere as HC and CO pollutants. Furthermore, currently produced catalytic converters are only effective when the engine is at operating temperature, so they have no effect on cold start emission levels.

Thus, a need exists for LPG fuel systems for automobiles with increased efficiency and decreased $CO_2$ emissions without a loss of power for the engine.

SUMMARY OF THE INVENTION

Accordingly, it is an object of this invention to reduce exhaust emissions of an internal combustion engine fueled by LPG.

Another object of the invention is to increase combustion efficiency for better fuel economy.

It is a further object of the invention to allow replacing the traditional gasoline and Diesel (fossil fuels) with cleaner alternatives.

It is another object of the present application to provide an LPG fuel system that reduces cold start exhaust emission levels so they are comparable to those of a natural gas fueled vehicle.

The LPG fuel conditioning system disclosed by this application was developed to decrease the inherent inefficiencies of engines using the current electronic fuel injection systems for automobile engines. In a preferred embodiment, the system permits quasi-complete combustion of the air/fuel mixture in conventional engines while significantly reducing exhaust emission levels and improving fuel economy.

In one embodiment, the LPG system maintains a certain vapor pressure in the LPG tank and delivers LPG in a gaseous phase to an LPG burning device at a set pressure and temperature through the use of an electric pump, a heat exchanger, solenoid controlled valves, a pressure regulator, a pressure sensor, and filters. The disclosed system further provides an arrangement where liquid propane circulates on demand through a heat exchanger, is heated and/or vaporized, and then returned to the vapor portion of the tank. Any vapor in the tank that is above the liquid phase is routed into a fuel filter and a pressure regulator, which brings the line pressure down to a set pressure suitable for a particular engine.

In a preferred embodiment, the system has a pressure sensor, which monitors the vapor pressure in the tank so that when the pressure drops below a defined threshold, the pump is activated and circulates liquid propane through the heat exchanger to bring the tank pressure back within said defined threshold. Operably, a pressure switch cuts the power to the pump and coolant supply solenoid and the solenoid valve placed in series with the pump, which prevents further liquid circulation through the pump and heat exchanger.

In one embodiment, the technology permits substantially complete combustion of an air/fuel mixture with reduced exhaust emissions and improved fuel economy.

BRIEF DESCRIPTION OF THE FIGURES

The manner in which these objectives and other desirable characteristics can be obtained is explained in the following description and attached figures in which:

FIG. 5 is a table reporting the results of a Federal Test Procedure, specifically, the CO, THC, NOx, and $CO_2$ emissions of the system.

DETAILED DESCRIPTION OF THE INVENTION

Generally disclosed is a LPG fuel system. In operation, the invention is accomplished by mixing vaporized LPG with air when the vapor and the air have either balanced heat loads or substantially equalized random kinetic energies. In one embodiment, the balanced heat loads or equalized random kinetic energies between the air and vaporized LPG can be produced by: (1) pumping LPG fuel from a fuel tank through a heat exchanger, wherein heat from engine coolant is used to vaporize the LPG fuel; (2) returning the vaporized LPG to the fuel tank so that LPG fuel and vaporized LPG fuel occupy the fuel tank; and (3) mixing vaporized LPG fuel with air from the atmosphere.

Figure 1:
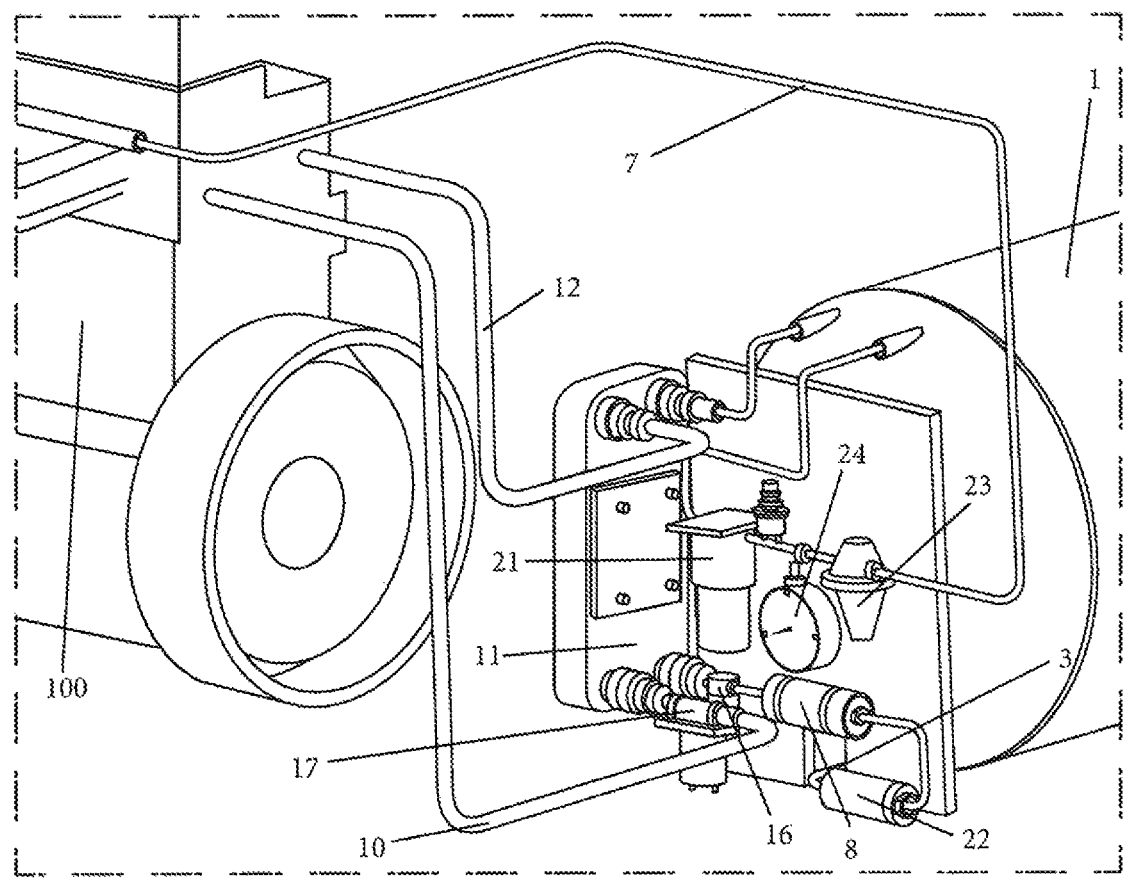
FIG. 1 is an environmental view of a preferable embodiment of the LPG fuel system.

FIG. 1 is an environmental view of one embodiment of the LPG fuel system for internal combustion engines. In use, LPG fuel may be drawn from the fuel tank 1 through a pipe 3 and a first filter 22 via an electric fuel pump 8. The fuel passes through a fuel solenoid valve 16 into a heat exchanger 11 and then is returned to the fuel tank 1. Coolant is circulated through the heat exchanger's control valve 17 and hose 10 and returned to the engine 100 via another hose 12. The engine coolant is metered so that, for example only 772.8 BTUs per gallon of LPG, is returned to the fuel tank 1. Vaporized LPG may be pushed from the tank 1 through a second filter 21 and a pressure regulator 23 into the engine's fuel rail via a pipe 7, and injected into the air stream for proper mixing and complete combustion. A pressure gauge 24 may optionally check the pressure in the fuel rail or be used to determine the condition of the second LPG filter 21.

Figure 2:
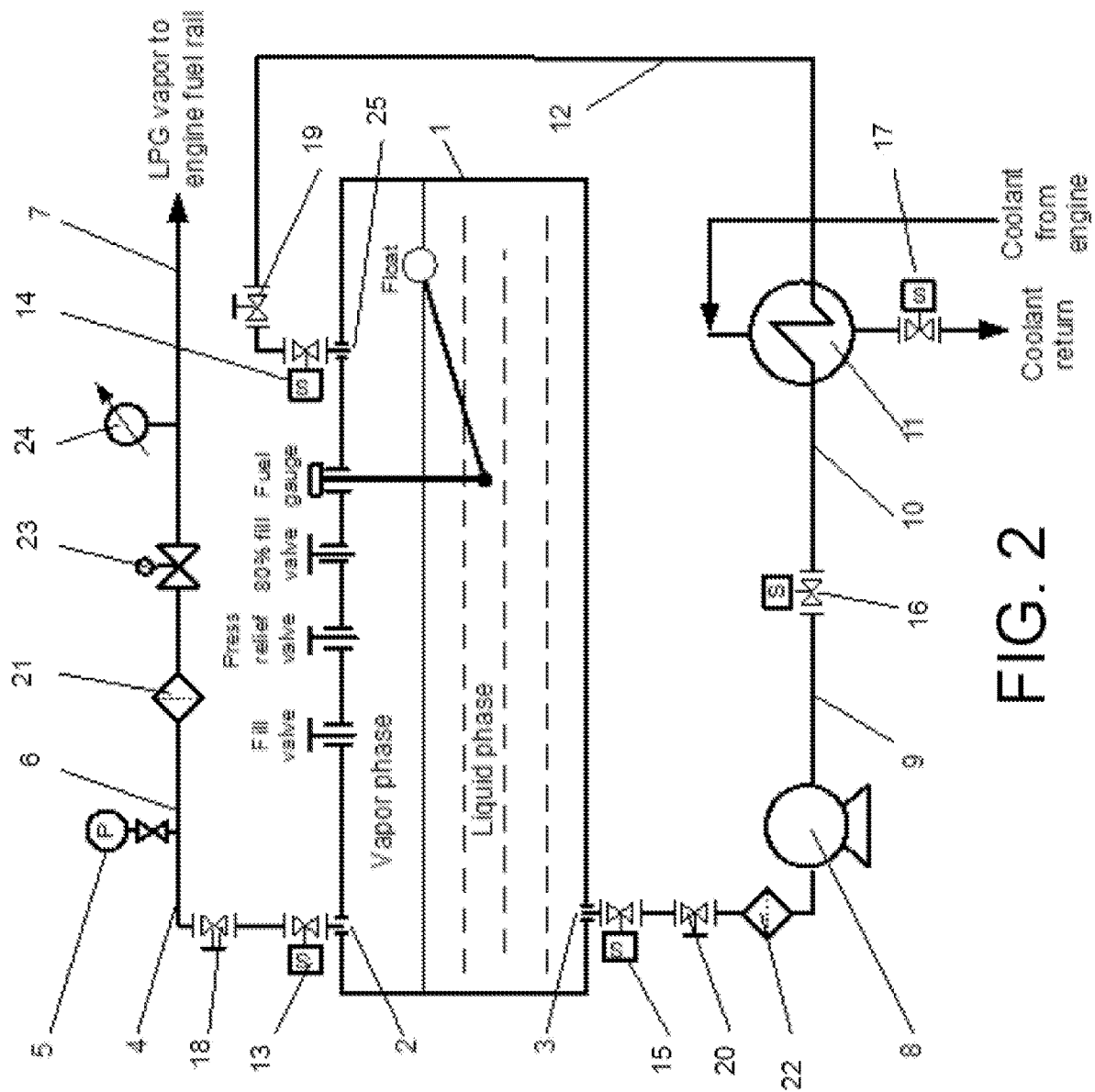
FIG. 2 is a flow chart of a preferable embodiment of the LPG fuel system.

FIG. 2 is a flow chart of a preferable embodiment of the invention. In this embodiment, the fuel system features a regular motor fuel tank 1 (e.g., an ASME motor fuel tank) having the standard fittings and valves. The vapor and liquid lines are fitted with shut-off solenoid valves 13, 14, 15 and manual shut-off valves 18, 19, 20. The LPG may pass through an opening 2 to a filter 21 via line 4, then the routed into the pressure regulator 23 via a line 6, which regulates the vapor output to a set pressure approximately forty to one-hundred psi. The pressure gauge 24 provides information regarding the condition of the second filter 21. The pressure switch 5 monitors the pressure in the LPG tank. When the tank pressure falls below the threshold pressure, the pressure switch 5 closes and energizes two of the solenoid valves 16, 17 and the LPG pump 8, which starts drawing liquid propane from the fuel tank 1 through solenoid valve 15, manual valve 20, liquid line 3, and filter 22. The LPG liquid travels down the fuel pump 8 via line 9, solenoid valve 16, and line 10 to the heat exchanger 11, where the LPG is heated and returned to the LPG tank 1 via line 12, manual valve 19, solenoid valve 14, and an opening 25 in order to increase the tank pressure. Once the LPG reaches the desired tank 1, the pressure switch 5 opens and the pump 8 powers off and solenoid valves 16 and 17 are shut off. The cycle repeats as necessary to maintain the desired pressure in the tank 1.

Figure 3:
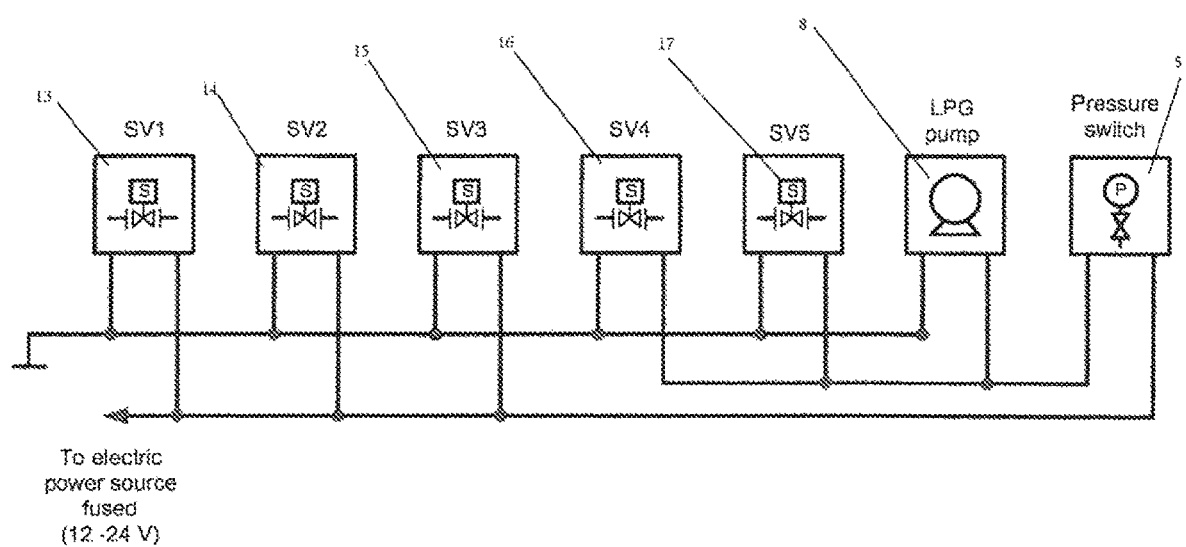
FIG. 3 is a block diagram of the connections of the electrical components of a preferable embodiment of the invention

FIG. 3 is a block diagram of the connections of the electrical components of the preferred embodiment between one another and to a suitable power supply. Referring now to FIG. 3, the shutoff valves 13, 14, 15 (SV1, SV2, SV3) are activated with a vehicle ignition switch (not shown) in case of on-road application. Although LPG tanks are usually provided with manual shut off valves on the vapor and liquid lines, the operator cannot be expected to manually turn off the fuel to the engine every time he turns the engine off. Therefore the disclosed design features solenoid shut-off valves 13, 14, 15 (SV1, SV2, SV3) to isolate the tank contents from the fuel system and engine rail when the engine is shut off or whenever maintenance (filter change) is required. The solenoid valves 16, 17 (SV4 and SV5) and the LPG pump 8 maybe powered on and off at the same time via pressure switch 5. For redundancy reasons, the switch 5 can optionally be doubled. In a preferred embodiment, the solenoid valve 16 (SV4) is connected to switch 5 and its role is to shut off the liquid line when the pressure switch 5 senses that the tank pressure has reached the threshold pressure. Solenoid valve 16 (SV4) valve may also act as a safety device against over pressurizing the tank, if coolant is circulating continuously through heat exchanger 11, following valve 17 (SV5) being stuck open accidentally.

Figure 4:
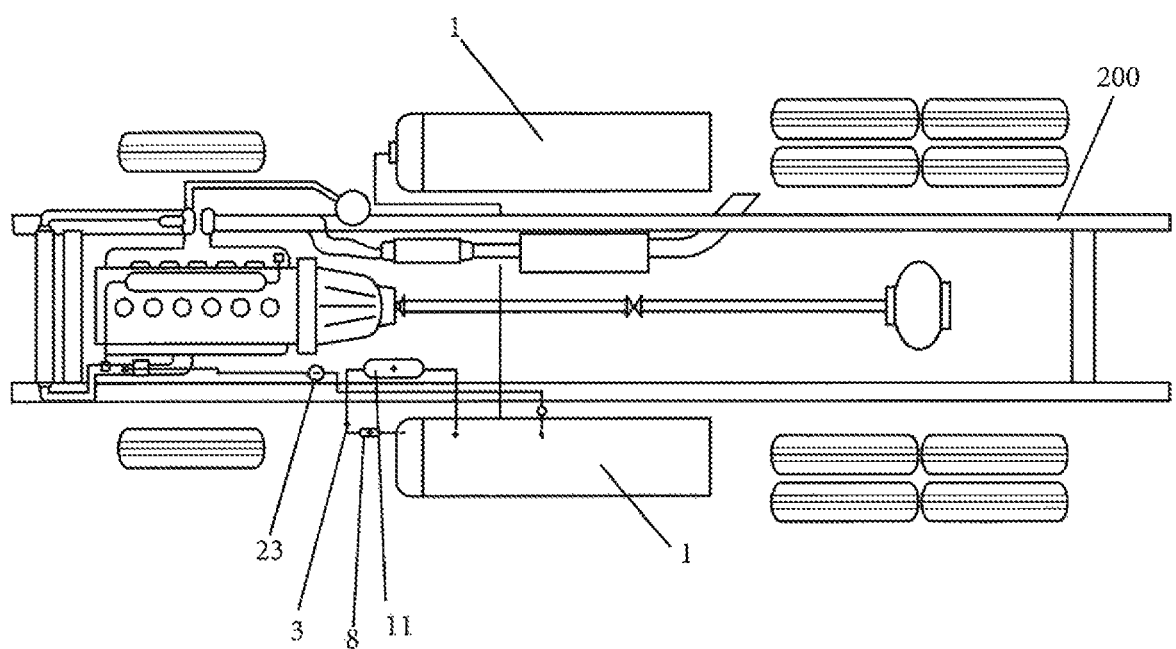
FIG. 4 is a diagram view of one preferable embodiment of the LPG fuel system mounted onto a vehicle.

FIG. 4 is a diagram of one embodiment of the invention mounted onto the base of a vehicle 200.

FIG. 5 shows the results of a test performed with the invention using a 6.0 Liter V8 spark ignited GM engine. In the embodiment used for the testing, the LPG fuel system was installed with a 500 gallon stationary tank to supply fuel for testing. The test protocol was a federal test procedure cycle for large spark-ignition engines under 40 CFR § 1065. The test simulates urban driving and reports pollutant emissions. FIG. 5 shows the reported exhaust emission values. The values in FIG. 5 are less than half of the current California Air Resources Board mandated regulations.

The system also features a built-in safety mechanism in case of a component failure. If solenoid valve 13 fails to open, the engine 100 will not start. In another embodiment, a calibrated restriction may be inserted between the pump 8 and the solenoid valve 16 to reduce the pressure waves and the risk of cavitation.

Disclosed is a liquefied petroleum fuel system that improves fuel economy by mixing vaporized liquid petroleum gas and ambient air at substantially equal random kinetic energies, wherein vaporized liquid petroleum gas is delivered to a liquid petroleum burning device at a set pressure and temperature. Further disclosed is a liquefied petroleum fuel system comprising: a pressure sensor that monitors the vapor pressure in a fuel tank and activates an electric pump that circulates liquid propane through a heat exchanger; and a pressure switch that eliminates power to the electric pump and solenoid valves to stop the circulation of liquid propane. Further disclosed is A method of mixing equalized kinetic energies of vaporized liquid petroleum gas and air by: obtaining a liquid petroleum gas fuel system comprising of a fuel tank, a heat exchanger, a pressure sensor, at least one pressure switch, an electric pump; pumping liquid petroleum gas from a fuel tank through a heat exchanger, wherein heat from engine coolant is used to vaporize the liquid petroleum gas; returning the vaporized liquid petroleum gas to the fuel tank so that liquid petroleum gas and vaporized liquid petroleum gas occupy the fuel tank; and, mixing vaporized liquid petroleum gas with air from the atmosphere.

Original claims are incorporated by reference as if fully set forth herein.

This specification and the appended figures illustrate only typical embodiments or principles disclosed in this application, and therefore, are not to be considered limiting of its scope, for the invention may admit to other equally effective embodiments that will be appreciated by those reasonably skilled in the relevant arts. Any invention disclosed by this specification is defined by the claims. While the ideas herein disclosed has been described by means of specific embodiments and applications thereof, numerous modifications and variations could be made thereto by those skilled in the art without departing from the scope of the invention set forth in the claims.

I claim:

1. A method of mixing vaporized liquid petroleum gas and air by:
   obtaining a liquid petroleum gas fuel system that improves fuel economy by mixing vaporized liquid petroleum gas and ambient air, wherein the vaporized liquid petroleum gas and the ambient air have balanced heat loads when mixed as vaporized liquid petroleum gas is delivered to a fuel rail of an internal combustion engine of a vehicle and injected into a stream of the ambient air at a set pressure and temperature, and wherein the system comprises:
   a pressure sensor;
   a fuel tank containing vaporized liquid petroleum gas and liquid petroleum gas at a set pressure;
   a liquid line defined by:
     a first line with a first solenoid valve and a first filter that is coupled at one end to the fuel tank and to a pump at another end of the first line so that the pump and fuel tank are in fluid communication;
     a second line with a second solenoid valve that is coupled at one end to the pump and to a heat exchanger at another end so that the pump and heat exchanger are in fluid communication, and where the heat exchanger imparts heat from engine coolant to fluid provided through said second line; and,
     a third line with a third solenoid valve coupled to said heat exchanger at one end and said fuel tank at the other end so that said heat exchanger is in fluid communication with said fuel tank;
   a vapor line defined by:
     a fourth line with a solenoid valve, a second filter, a pressure switch that is integrated with the pressure sensor, a pressure regulator, and a pressure gauge, where the fourth line is coupled at one end to the fuel tank and the fuel rail of the internal combustion engine so that the fuel tank and fuel rail are in fluid communication;
     where the pressure regulator ensures that vaporized liquid petroleum gas in said fourth line is at a set pressure in a range of forty to one-hundred pounds per square inch;
     where the pressure switch monitors the pressure in the fuel tank and is configured to close when the pressure in the fuel tank is below a set value and open when the tank is above said set value;
     where the first solenoid is configured to open when the pressure switch is closed and to close when the pressure switch is open;

where the pump is configured to (a) draw said liquid petroleum gas from said tank into said first line, across said second line to said heat exchanger to vaporize said liquid petroleum gas by exchanging 772.8 British Thermal Units of heat per gallon of liquid petroleum gas and (b) return the vaporized liquid petroleum gas to the fuel tank so that liquid petroleum gas and vaporized liquid petroleum gas occupy the fuel tank;

an air stream containing said ambient air, where said air stream is coupled to said engine fuel rail so that said fourth line and said air stream are in fluid communication with the fuel rail where said ambient air in the air stream and the vaporized liquid petroleum gas have balanced heat loads as the ambient air and fuel rail are delivered to the fuel rail;

determining that pressure inside of said fuel tank is below said set value;

shutting said pressure switch so that vaporized liquid petroleum gas is not flowing through said vapor line;

pumping liquid petroleum gas from a fuel tank through the first line, the second line, and the heat exchanger via said pump, wherein heat from engine coolant is used by the heat exchanger to vaporize the liquid petroleum gas;

returning the vaporized liquid petroleum gas that is output from the heat exchanger to the fuel tank along the fourth line so that liquid petroleum gas and vaporized liquid petroleum gas occupy the fuel tank until the pressure inside of said fuel tank is above said set value;

closing the liquid line opening said pressure switch so that vaporized liquid petroleum gas at said pressure flows through said vapor line;

mixing said vaporized liquid petroleum from said with air from the atmosphere in the fuel rail of the internal combustion engine; and, where said liquid petroleum gas is propane.

2. The method of claim 1 wherein said set value is one-hundred pounds per square inch.

3. The method of claim 2 wherein said internal combustion engine has 16.1 brake horsepower per hour and a hot start Carbon Dioxide Emission of 755.9 grams per brake horse power hour.

* * * * *